Patented Jan. 8, 1952

2,581,375

UNITED STATES PATENT OFFICE 2,581,375

ESTERS OF SULFO HIGH FATTY ACIDS WITH OXYALKYLATED PHENOL ALDEHYDE RESINS

Melvin De Groote, St. Louis, and Bernhard Keiser, Webster Groves, Mo., assignors to Petrolite Corporation, Ltd., Wilmington, Del., a corporation of Delaware No Drawing. Application December 10, 1948, Serial No. 64,451

12 Claims. (Cl. 260—19)

The present invention is concerned with certain new chemical products, compounds or compositions, having useful application in various arts. This invention is a continuation-in-part of our co-pending application, Serial No. 734,204, filed March 12, 1947, and now abandoned. It includes methods or procedures for manufacturing said new products, compounds or compositions, as well as the products, compounds or compositions themselves.

Said new compositions are the esters of a sulfo higher fatty acid having at least 8 carbon atoms and not more than 22 carbon atoms in the fatty acid acyl group and in which the hydrogen atom of the sulfo radical has been replaced by a cation, and the ester linkage involved is by virtue of the higher fatty acid carboxylic radical and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula

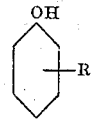

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application, Serial No. 64,450, filed December 10, 1948, now Patent No. 2,541,994, issued February 20, 1951. See also our co-pending application, Serial No. 64,469, filed December 10, 1948.

The new products are useful as wetting, detergent and levelling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as for example, for cosmetics, spray oils, water-repellent textile finishes; as lubricants, etc.

The oxyalkylated resins, used to provide the alcoholic radical of the new esters, are described in our Patents 2,499,370, granted March 7, 1950, and 2,541,991, granted February 20, 1951, and reference is made to those patents for a description of the phenol-aldehyde resins used and their oxyalkylation to produce the alcoholic products. For specific examples of the resins, reference is made to Examples 1a through 103a of Patent 2,499,370. For examples of the oxyalkylated products, reference is made to Examples 1b through 18b of Patent 2,499,370 and to the tables which appear in columns 51 through 56 thereof, and also is made to the tables which appear in columns 31 through 46 of Patent 2,541,991.

Having prepared or purchased suitable oxyalkylated derivatives to be used as alcoholic reactants, one must either purchase or prepare suitable sulfo derivatives of the kind previously described. Such sulfo derivatives may be exemplified by the following:

*Example 1c*

Sulfo oleic acid ethyl ester ammonium salt is prepared as per directions in U. S. Patent No. 1,822,977 to Münz.

*Example 2c*

Sulfo oleic acid methyl ester ammonium salt is prepared in accordance with the directions in the aforementioned Münz Patent No. 1,822,977.

Example 3c

The sulfo ricinoleic acid isopropyl alcohol ester triethanolamine salt is prepared as per directions in aforementioned U. S. Patent No. 2,032,314 to Bertsch.

Example 4c

Sulfo oleic acid normal propyl ester triethanolamine salt is prepared according to directions in aforementioned Bertsch Patent No. 2,032,314.

Example 5c

Sulfo oleic acid methyl ester monoethanolamine salt is prepared as per directions in aforementioned U. S. Patent No. 1,822,978 to Münz.

Example 6c

Butyl sulfoxylylstearate sodium salt is prepared according to the directions in U. S. Patent No. 2,302,070 dated November 17, 1942, to Stirton, Peterson, and Groggins.

Example 7c

Methyl sulfoxylylstearate sodium salt is prepared according to the directions in aforementioned U. S. Patent No. 2,302,070 to Stirton et al.

Example 8c

Butyl sulfocymylstearate ammonium salt is prepared from normal butyl oleate and paracymene according to the directions in aforementioned Patent No. 2,302,070.

Having available the polyhydroxylated reactant, i.e., the reactant obtained by oxyalkylation of the phenol resins, one need only cause cross-esterification or trans-esterification to take place by the elimination of the low molal alcohol which occupies the carboxylic hydrogen position in the sulfo fatty reactant. Such reaction is essentially an alcoholysis reaction in which the low molal alcohol, methyl alcohol, ethyl alcohol, isopropyl alcohol, normal propyl alcohol, butyl alcohol, or the like is eliminated. As is well known, such reactions are catalyzed by the presence of an alkaline substance; approximate ½% to 1% of an alkaline substance such as sodium acetate, sodium oleate, sodium carbonate, sodium methylate, caustic potash, or the like, may be added. Similarly, such reactions are catalyzed by a variety of other substances such as calcium or lead naphthenates, etc. Our preference is to use approximately ½% of sodium methylate as a catalyst. The hydroxyl value of the polyhydric alcohol can be calculated, based on the value of the reactants, or can be determined by the Verley Bölsing method or any other suitable method. Having calculated the hydroxyl value, one can also calculate the appropriate amount of sulfo fatty reactant required for the complete esterification or complete conversion into the corresponding sulfo fatty acid ester with the elimination of the low molal alcohol. We have found that desirable products are obtained by conversion of as little as 20% to 25% into the sulfo fatty acid esters. In other words, on conducting our reaction we may vary from five stoichiometric equivalents of the polyhydric reactant in comparison to the sulfo fatty acid ester, or we may employ completely equivalent amounts, that is, for each five stoichiometric equivalents of the polyhydric acylating reactant, i. e., the sulfo acid ester. Comparison of the reaction can be determined in the customary manner, for instance, by measuring the amount of low molal alcohol evolved or by a saponification number on the finished product, or by any other suitable procedure.

Example 1d 1111 pounds of an oxyalkylated thermoplastic phenolaldehyde resin as exemplified by Example 122b of Patent 2,541,991, were treated to remove xylene and reacted with 85 pounds of sulfo oleic acid methyl ester ammonium salt to effect approximately a 20% acylation. The reaction was conducted at approximately 140° to 160° C. for 2 to 4 hours, using ½% of sodium methylate as a catalyst. Methyl alcohol was evolved and the completion of the reaction was indicated by the fact that there was no further evolution of methyl alcohol. The entire mass, of course, was agitated continuously during the acylation reaction.

Example 2d

The same procedure was followed as in Example 1d, preceding, except that sufficient acylation reactant was added to convert 50% of available hydroxyl into the ester form (50% acylation). As a specific example, the following ratios were employed: 1328.7 grams of xylene-containing oxyalkylated resin 123b of Patent 2,541,991 were reacted with 213 grams of sulfo oleic acid methyl ester ammonium salt as in Example 1d.

Example 3d

The same procedure was followed as in Examples 1d and 2d, preceding, except that the amount of sulfo oleic acid methyl ester ammonium salt employed was sufficient to esterify all available hydroxyl groups (complete acylation). As a specific example, the following ratios were employed: 854 grams of xylene-containing oxyalkylated resin 116b of Patent 2,541,991 were reacted with 426 grams of sulfo oleic acid methyl ester ammonium salt as in Example 1d.

Example 4d

The same procedure was followed as in Example 1d preceding, except that sulfo ricinoleic acid ethyl ester ammonium salt was used instead of sulfo oleic acid methyl ester ammonium salt in Examples 1d to 3d, preceding. As a specific example, the following ratios were employed: 511 grams of xylene-containing oxyalkylated resin 125b of Patent 2,541,991 were reacted with 213 grams of sulfo ricinoleic acid ethyl ester ammonium salt as in Example 1d.

Example 5d

The same procedure was followed as in Examples 1d to 3d, preceding, except that sulfo linoleic acid isopropyl ester ammonium salt was used in place of sulfo oleic acid methyl ester ammonium salt. As a specific example, the following ratios were employed: 973 grams of xylene-containing resin 126b of Patent 2,541,991 was reacted with 435 grams of sulfo linoleic acid isopropyl ester ammonium salt as in Example 1d.

Example 6d

The same procedure was followed as in Examples 1d to 3d, preceding, except that butyl sulfoxylylstearate ammonium salt was employed instead of sulfo oleic acid methyl ester ammonium salt. As a specific example, the following ratios were employed: 751 grams of xylene-containing oxyalkylated resin 141b of Patent 2,541,991 were reacted with 308 grams of butyl sulfoxylylstearate ammonium salt as in Example 1d.

Example 7d

The same procedure was followed as in Example 1d preceding, except that butyl sulfocymylstearate ammonium salt was used instead of sulfo oleic acid methyl ester ammonium salt. As a specific example, the following ratios were employed: 903 grams of xylene-containing oxyalkylated resin 139b of Patent 2,541,991 were reacted with 230 grams of butyl sulfocymylstearate ammonium salt as in Example 1d.

As previously pointed out the oxyalkylated resins, such as Example 122b of Patent 2,541,991 employed in Example 1d, preceding, are obtained in a form which includes xylene as a solvent. The xylene was removed in the conventional manner as referred to elsewhere by distillation, particularly vacuum distillation. However, if desired, the xylene need not be removed and the experiments previously noted, for instance, Examples 1d to 7d, inclusive, can be repeated leaving the xylene present. Under such circumstances the alcohol liberated, for instance, methyl alcohol, is not evolved but stays dissolved in the xylene. In such instance the reaction chamber should be equipped with a condenser and the conventional equipment. The completeness of the reaction can be determined by the fact that the xylene can be washed to remove the alcohol and the decrease in volume noted. We have employed both procedures without noting any particular difference in the composition of the ultimate product. However, if this latter procedure is employed we must prefer to use the methyl or ethyl ester rather than the butyl ester, or even a higher alcohol ester, such as the amyl ester.

The oxyalkylated resins, as far as appearance goes, have a resin- to wax-like and fat-like character and color varies from light amber to deep amber, or reddish color  The sulfo reactants generally vary in appearance from a honey yellow to a deep red or dark amber color. The products of reaction, that is, the new compositions as described, will vary in appearance on a solvent-free basis, from an amber to a deep amber or reddish amber in color, and viscosity may vary somewhat from that of an oil to that of a heavy-bodied castor oil, or thereabouts.

It is to be noted that the salt form of the sulfo fatty acid ester is not limited to the sodium, ammonium or potassium form, or even to the form employing low molal amines, for instance, ethanolamine, diethanolamine, triethanolamine, butylamine, amylamine, acetylamine, etc. Our preference, however, is to use either the ammonium, sodium, or potassium salt or a nonhydroxylated amine and particularly a tertiary amine of definite basicity, such as dimethyloctylamine, dimethyloctadecylamine, dimethyldecylamine, dimethyldodecylamine, etc. It is to be noted that when a high molal amine is used, for instance, one having present at least one radical having 8 carbon atoms or more, one obtains a marked hydrophobe effect due to the use of such particular amine salt. This is noticeable, particularly when the dimethylated amines of the kind enumerated are employed.

Sulfo fatty acids as herein described have been obtained from higher fatty acids having as few as 11 carbon atoms, as in the case of undecylic acid, and as many as 22 carbon atoms, as in the case of fatty acids derived from jojoba bean oil.

We claim:

1. An ester of a sulfo high fatty acid having at least 8 carbon atoms and not more than 22 carbon atoms in the fatty acid acyl group and in which the hydrogen atom of the sulfo radical has been replaced by a cation, and the ester linkage involved is by virtue of the higher fatty acid carboxylic radical and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide, and (B) an oxyalkylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula

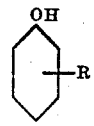

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. An ester of a sulfo high fatty acid having at least 8 carbon atoms and not more than 22 carbon atoms in the fatty acid acyl group and in which the hydrogen atom of the sulfo radical has been replaced by a cation, and the ester linkage involved is by virtue of the higher fatty acid carboxylic radical and the alcoholic radical is that of certain hydrophile polyhydric synthetic products; such hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula

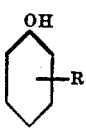

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said ester, as well as said oxyethylated resin, in an equal weight of xylene are sufficient to produce an emulsion when said xylene solution is shaken vigorously with one to three volumes of water.

3. An ester of a sulfo high fatty acid having at least 8 carbon atoms and not more than 22 carbon atoms in the fatty acid acyl group and in which the hydrogen atom of the sulfo radical has been replaced by a cation, and the ester linkage involved is by virtue of the higher fatty acid carboxylic radical and the alcoholic radical is that of certain hydrophile polyhydric synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and an aldehyde having not over 8 carbon atoms and having one functional group reactive toward said phenol; said resin being formed in the substantial absence of phenols of functionality greater than two; said phenol being of the formula

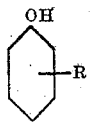

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said ester, as well as said oxyethylated resin, in an equal weight of xylene are sufficient to produce an emulsion when said xylene solution is shaken vigorously with one to three volumes of water.

4. An ester of a sulfo high fatty acid having at least 8 carbon atoms and not more than 22 carbon atoms in the fatty acid acyl group and in which the hydrogen atom of the sulfo radical has been replaced by a cation, and the ester linkage involved is by virtue of the higher fatty acid carboxylic radical and the alcoholic radical is that of certain hydrophile polyhydric synthetic products; said hydrophile synthetic products being oxyethylation products of (A) ethylene oxide; and (B) an oxyethylation-susceptible, fusible, organic solvent-soluble, water, insoluble, low-stage phenol-formaldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula

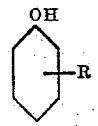

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $$(C_2H_4O)_n$$

wherein $n$ is a numeral varying from 1 to 20; with the proviso that at least 2 moles of ethylene oxide be introduced for each phenolic nucleus; and with the final proviso that the hydrophile properties of said ester, as well as said oxyethylated resin, in an equal weight of xylene are sufficient to produce an emulsion when said xylene solution is shaken vigorously with one to three volumes of water.

5. The product of claim 3 wherein R is substituted in the para position.

6. The product of claim 3 wherein R is a butyl radical substituted in the para position.

7. The product of claim 3 wherein R is an amyl radical substituted in the para position.

8. The product of claim 3 wherein R is a nonyl radical substituted in the para position.

9. The product of claim 4 wherein R is substituted in the para position.

10. The product of claim 4 wherein R is a butyl radical substituted in the para position.

11. The product of claim 4 wherein R is an amyl radical substituted in the para position.

12. The product of claim 4 wherein R is a nonyl radical substituted in the para position.

MELVIN DE GROOTE.
BERNHARD KEISER.

No references cited.